Patented Feb. 10, 1948

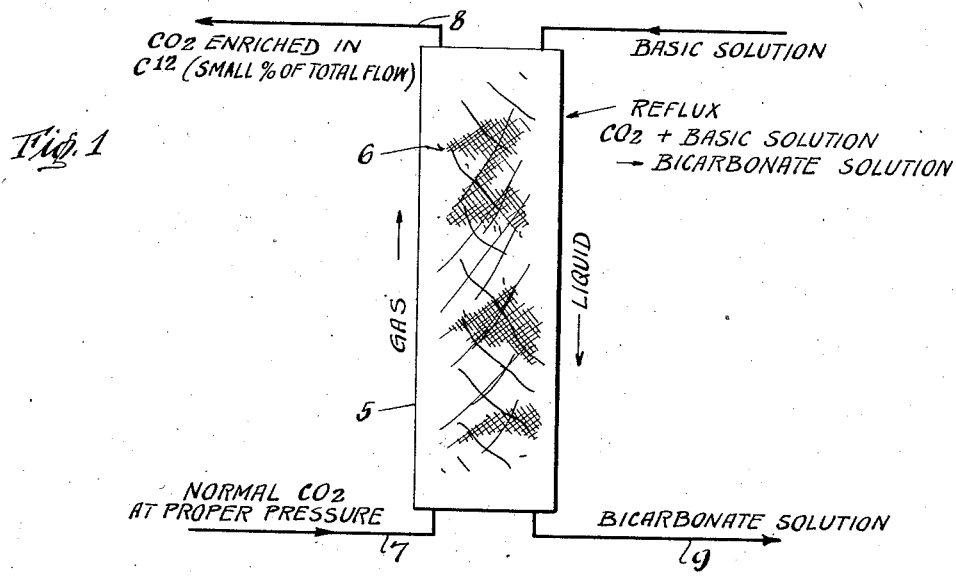
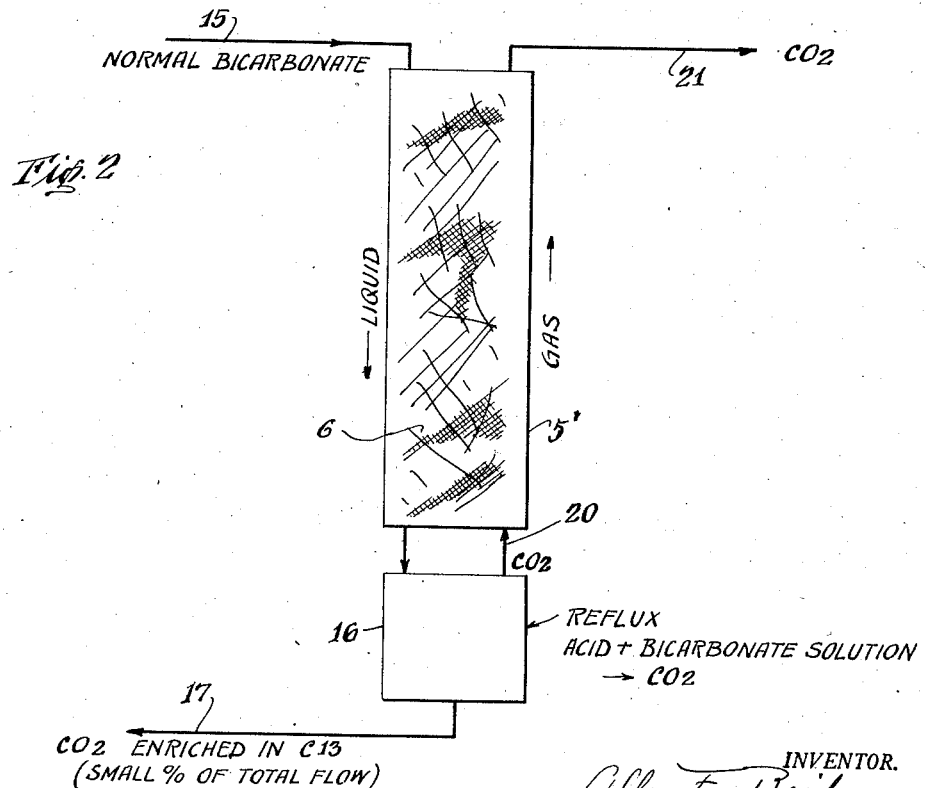

2,435,796

UNITED STATES PATENT OFFICE 2,435,796

ISOTOPE SEPARATION PROCESS

Allen Francis Reid, New York, N. Y.

Application May 4, 1944, Serial No. 534,023

8 Claims. (Cl. 23—150)

This invention relates to the concentration of isotopes and particularly to the isotopes of carbon and oxygen.

The object of the invention is to relatively increase the concentration of a carbon or an oxygen isotope and involves heterogeneous catalyzed chemical exchange reactions between carbon dioxide, carbonic acid, bicarbonate ion and water.

The carbon and oxygen are then distinguishable by the relative isotopic concentration and may be used as isotopic tracers and for other purposes in the study of carbon and oxygen and in quantitive analysis and other reactions.

In the accompanying drawing illustrating the invention

Fig. 1 is a diagrammatic view of a column adapted for the concentration of the isotope $C^{12}$, and Fig. 2 is a similar view of a column for concentration of $C^{13}$.

Referring to the system shown in Fig. 1, a vertical container or tower 5 is packed in any desired manner with material 6. The column is then filled with $CO_2$ for instance through supply 7 at the bottom, and a base solution is introduced at the top reacting with the $CO_2$ to form $HCO_3^-$ which travels down the column. Normal $CO_2$ is fed in at 7 at constant pressure. Since the heavier carbon concentrates in the liquid phase, the $C^{12}$ is concentrated at the top and a small percentage of the $CO_2$ enriched in $C^{12}$ is bled out at the outlet 8 at the top of the column. At the outlet 9 at the bottom there is a steady draining out of bicarbonate solution.

Normally and without catalysis there are competing rate controlling reactions:

(1) $\qquad CO_2$ (dissolved) $+ OH \rightleftarrows HCO_3^-$ (2) $\qquad CO_2$ (dissolved) $+ H_2O \rightleftarrows H_2CO_3$ To increase the exchange rate I have found that the reactions may be speeded up many times in a system applying heterogeneous catalysis. Under proper conditions of catalysis the slow process is then in the mixing and diffusion and may be controlled by provision of prompt and intimate distribution and contact of the gases and liquids. The exchange reactions are (3) $C^{13}O_2$ (gas) $+ [xH_2C^{12}O_3 + (1-x)HC^{12}O_3^-]$ in solution $=$ $C^{12}O_2$ (gas) $+ [xH_2C^{13}O_3 + (1-x)HC^{13}O_3^-]$ in solution (4) $CO_2^{16}$ (gas) $+ 2H_2O^{18}$ (liquid) $= CO_2^{18}$ (gas) $+ 2H_2O^{16}$ (liquid)

both (3) and (4) resulting in a fractionation factor suitable for isotopic concentration at moderately low temperature.

For a practical increase in concentration of an isotope use is made of a system, such as a fractionating column, involving reflux over extended surfaces such as a number of plates. In such a system the amount of concentration is a direct function of the rate of exchange of the isotopes in question between the two phases. The rate is dependent either on the mixing or diffusion rates which bring the reacting species of the slow reaction in the mechanism together, or by the rate of the slow reaction, or both. As previously noted, where the rate of the reaction has been speeded up sufficiently the mixing and diffusion factors become determinative.

In the present system the factors involved in the operation include a. A pressure of $CO_2$ increased preferably above 6 atmospheres giving a corresponding increase in the concentration of the $CO_2$ (dissolved)

b. A pH sufficiently high so that advantage may be taken of the catalyzed Reaction 1 c. A gas flow of sufficient velocity for turbulence to increase the mixing and diffusion rates d. As high a temperature as is necessary to keep the catalyzed rates of Reactions 1 and 2 great enough so that they are not rate controlling. The upper temperature limit will be dictated by practical considerations and by the lowering of the fractionation factor per plate as this decreases with increasing temperature.

e. An effective and practical packing with efficient fractionating characteristics and sufficient catalytic activity so that the Reactions 1 and 2 are not rate controlling.

The following may be taken as expressing the conditions of isotopic exchange in packed columns:

$$H\frac{\partial N}{\partial t} = L\frac{\partial N}{\partial z} - kcC\{N(1-n) - \alpha n(1-N)\} \quad (5)$$

$$h\frac{\partial n}{\partial t} = -l\frac{\partial n}{\partial z} + kcC\{N(1-n) - \alpha n(1-N)\} \quad (6)$$

where $k$ is a constant; $C$ is the concentration in moles per unit volume of carbon in the liquid; $N$ is the mole fraction of heavy carbon in the liquid; $H$ is the moles of holdup per unit length of combined light and heavy carbon in the liquid; $L$ is the flow of light and heavy carbon in the liquid in moles per unit time; and where lower case symbols designate the corresponding quantities in the gas phase, $z$ is the distance along the column measured from the reflux end, and at equilibrium:

$$\alpha = \frac{N(1-n)}{n(1-N)} \quad (7)$$

Inspection of (6) and (7) indicates at once that for any given column the highest fractionation is obtained with the highest value of $kcC$. However, that factor is an exchange rate constant per unit length of column, and as such varies from column to column with the cross-sectional area, so that the exchange rate per unit volume of packing, irrespective of the size of the particular column used turns out to be $kcC/A$, where A is the cross-sectional area, and is the quantity to be maximized.

The value of $\alpha$ (alpha) will be taken as 1.012.

The following runs are typical of results attained at room temperature:

| | Pressure in Atmos. | Base used | Flow moles per cm.³ per min. ×10⁻³ | $kcC/A$ moles per cm.³ per min. |
|---|---|---|---|---|
| Packing etched siliceous shale 6-8 mesh. | 6 | 2.3M NH₄OH | 15.4 | 10.5×10⁻⁵ |
| Do | 16 | do | 16.1 | 35.4×10⁻⁵ |
| ⅛″ Pyrex helices etched 23 mins. | 18 | 2.6M NH₄OH | 17.3 | 38×10⁻⁵ |
| Do | 50 | 2.5M NH₄OH | 16.4 | 40×10⁻⁵ |

The etching was with 8.4% HF solution, and siliceous packing thus etched was satisfactory. The siliceous shale packing had sufficient catalytic activity and good fractionating characteristics. The Pyrex helices similarly etched also showed easily sufficient catalytic activity and somewhat better fractionating characteristics. Activated charcoal (Morell Char. No. 7) and Al₂O₃ have sufficient catalytic activity when fresh. Corning Fiber Glass No. 9930 and other catalysts are also effective as indicated in the following data from runs in small reaction vessels filled with the packing moistened with the liquid phase filled with the gas phase and allowed to stand for a limited length of time:

| Packing | Solution | Temp., °C | Pressure CO₂, lb./in.² | $kcC/A \times 10^5$ moles/cc. min. | |
|---|---|---|---|---|---|
| | | | | O-exchange | C-exchange |
| Calcined silica gel | H₂O, 0.111% H₂O¹⁸ | 25 | 765 | 59 | |
| 20% PbCO₃ on Al₂O₃ | do | 23 | 765 | 40 | |
| Do | do | 64 | 765 | 80 | |
| Al₂O₃, 15.2% H₂O | do | 28 | 765 | 140 | |
| Do | 2.1 M KHCO₃, 4.7% KHC¹³O₃ | 29 | 765 | | 260 |
| Morell Char. No. 7 | H₂O, 0.111% H₂O¹⁸ | 23.5 | 765 | 351 | |
| Fiber A: Corning Fiber Glass No. 9930. | 2.1 M KHCO₃, 4.7% KHC¹³O₃ | 26 | 765 | | 630 |

This system of accelerating the C and O isotope concentration is practical and inexpensive. The materials are commonly available, nonpoisonous and the reactions are not complicated or coupled with any undesirable results.

The column of Fig. 1 is shown operative for enrichment of CO₂ above the normal amount of C¹² and with depletion of C¹³.

A similar column Fig. 2 may be used for concentrating C¹³ with reflux and production at the bottom and supply and drain at the top, reflux being caused by the addition of a cheap commercial acid to the bicarbonate solution. In this Fig. 2 a normal bicarbonate solution is supplied at 15 and the liquid progresses downward in the packed column 5′ as the CO₂ gas from the lower reflux 16 progresses upward through connector 20 to the column and the upper discharge outlet at 21. Acid supplied to the reflux reacts with the bicarbonate solution to give the CO₂ a small percentage of which enriched in C¹³ is drawn off at the lower outlet 17.

The system of this invention thus provides a practical and inexpensive source of concentration of oxygen and carbon isotopes. The tortuous passages through the packed column impart a turbulence to the gas phase of the exchange and desired pressures may be readily attained. The materials used are readily available and the system does not involve any poisonous substances or hazardous conditions of operation.

I claim:

1. A process of relatively concentrating isotopes of carbon and of oxygen comprising reacting carbon dioxide with carbonic acid, bicarbonate ion and water under pressure from 6 to approximately 50 atmospheres at room temperature to approximately 64° C. in the presence of a heterogeneous catalyst packing containing a member of the group consisting of silicon oxide, a silicate, carbon and aluminum oxide and flowing carbon dioxide into the solution of carbonic acid and bicarbonate ion at a rate above 15 millimoles per sq. cm. per minute to give a substantial relative isotopic concentration, continuing said reaction to change the concentration of the isotopes of carbon and oxygen, and bleeding off from the heterogeneous catalyst a fluid enriched with the desired isotope.

2. A process of relatively concentrating an element as set forth in claim 1 comprising reacting the carbon dioxide, carbonic acid, bicarbonate ion and water in the presence of aluminum oxide as a heterogeneous catalyst.

3. A process of relatively concentrating an isotope of carbon and oxygen comprising reacting carbon dioxide with carbonic acid, bicarbonate ion and water under pressure above atmosphere at room temperature to approximately 64° C. in the presence of a catalyst of a group of materials heterogeneous with respect to the reactants and containing a member of the group consisting of silicon oxide, a silicate, carbon, and aluminum oxide at a pH of 5 or over to give a substantial relative isotopic concentration, continuing said reaction to change the concentration of the isotopes of carbon and oxygen, and bleeding off a fluid enriched with the desired isotope.

4. A process of relatively concentrating an isotope of carbon and oxygen as set forth in claim 3 comprising reacting carbon dioxide and the water solution of carbonic acid and bicarbonate ion under pressure ranging from 6 to approximately 50 atmospheres, continuing said reaction to change the concentration of the isotopes of carbon and oxygen and bleeding off from said catalyst a fluid enriched with the desired isotope.

5. A process of relatively concentrating an isotope of carbon and oxygen as set forth in claim 3 comprising flowing carbon dioxide into the solution of carbonic acid and bicarbonate ion at a rate above 15 millimoles per sq. cm. per minute, continuing said reaction to change the concentration of the isotypes of carbon and of oxygen and bleeding off from said catalyst a fluid enriched with the desired isotope.

6. A process of relatively concentrating isotopes of carbon and of oxygen comprising reacting carbon dioxide with carbonic acid, bicarbonate ion and water by flowing carbon dioxide upward counter current into a descending solution of carbonic acid and bicarbonate ion at a sufficient velocity for turbulence to increase the mixing and diffusion rates and at moderately low temperature above room temperature in the presence of a heterogeneous catalyst packing containing a member of the group consisting of silicon oxide, a silicate, carbon and aluminum oxide to give a substantially relative isotopic concentration, continuing said counter current reaction to change the concentration of the isotopes of carbon and bleeding off $CO_2$ enriched in $C_{12}$ from the heterogeneous catalyst at the upper portion of the counter current exchange.

7. A process of relatively concentrating isotopes of carbon and of oxygen comprising reacting carbon dioxide with carbonic acid, bicarbonate ion and water by flowing carbon doxide upward countercurrent into a descending solution of carbonic acid and bicarbonate ion at a sufficient velocity for turbulence to increase the mixing and diffusion rates and at moderately low temperature above room temperature in the presence of a heterogeneous catalyst packing containing a member of the group consisting of silicon oxide, a silicate, carbon and aluminum oxide to give a substantially relative isotopic concentration, continuing said countercurrent reaction to change the concentration of the isotopes of carbon and bleeding off $CO_2$ enriched in $C_{13}$ from the heterogeneous catalyst at the lower portion of the countercurrent exchange.

8. A process of relatively concentrating isotopes of carbon and of oxygen which comprises passing into countercurrent contact ammonium bicarbonate water solution and carbon dioxide under a pressure from 6 to approximately 50 atmospheres at a temperature within the range of from room temperature to about 64° C. in the presence of a hetergeneous catalyst packing containing a member of the group consisting of silicon oxide, a silicate, carbon and aluminum oxide, the carbon dioxide in said countercurrent contact being fed at a rate above about 15 millimoles per square centimeter per minute and sufficient for turbulence to increase the mixing and diffusion rates and to cause a substantial relatively isotopic concentration continuing said countercurrent contact to change the concentration of the isotopes of carbon and oxygen and bleeding off from the reaction zone a fluid enriched with the desired isotopes.

ALLEN FRANCIS REID.

REFERENCES CITED

The following references are of record in the file of this patent:

UNITED STATES PATENTS

| Number | Name | Date |
| --- | --- | --- |
| 2,156,851 | Hansgirg | May 2, 1939 |

OTHER REFERENCES

Urey et al., "Concentration of the Carbon Isotope," Chemical Abstracts, vol. 30, page 7027, (1936).

Reid et al., "Use of the Exchange Between $CO_2$, $H_2CO_3$, $HCO_3$ Ion and $H_2O$ for Isotope Separation," Chemical Abstracts, vol. 37, page 6186, (1943).

Webster et al., "Fractionation of Oxygen Isotopes in an Exchange Reaction," Chemical Abstracts, vol. 29, page 2842, (1935).

Hilditch, "Catalytic Processes in Applied Chemistry," pages 186–189, 236. Pub. by D. VanNostrand Co., N. Y., (1929).